United States Patent Office 3,095,448
Patented June 25, 1963

3,095,448
CYCLOALKYL-ALKYL HYDRAZINES
John H. Biel, Milwaukee, Wis., assignor, by mesne assignments to Lakeside Laboratories, Inc., Milwaukee, Wis., a corporation of Delaware
No Drawing. Filed July 30, 1958, Ser. No. 751,887
5 Claims. (Cl. 260—563)

This invention relates to hydrazine derivatives. More particularly, this invention is concerned with novel cycloalkyl-alkyl hydrazines, salts and derivatives thereof, and methods of preparing the same. It is also concerned with the use of such compounds as chemotherapeutics.

According to the present invention there are provided cycloalkyl-alkyl hydrazines of the formula

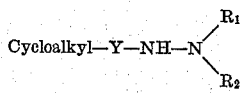

and methane sulfonic acid derivatives and acid addition salts thereof, wherein cycloalkyl represents a cyclohexyl, cyclopentyl or cyclopropyl group, Y is a straight or branched alkylene group of not more than five carbons, and $R_1$ and $R_2$ are the same or different hydrogen, alkyl groups such as methyl, ethyl, propyl, isopropyl, butyl and the like, aryl groups and particularly the phenyl group, aralkyl groups and particularly those in which the aryl moiety is monocyclic and the alkyl moiety is a lower alkyl group such as benzyl, phenethyl, or phenylpropyl, acyl groups such as the acetyl, propionyl, benzoyl, cyclohexane-carbonyl, phenylacetyl, isonicotinyl, benziloyl, glutamyl and 5-pyrrolidone-2-carboxyl groups and groups in which $R_1$ and $R_2$ are joined to form a ring with the nitrogen in the ring including the morpholino, pyrrolidino, piperidino, 1,2,3,4-tetrahydroisoquinolino, 1,2,3,4-tetrahydroquinolino, isoindolino, 4-lower alkyl-1-piperazino, 3-hydroxypiperidino, 4-hydroxypiperidino, indolino, theophyllino, and phenothiazino groups.

Compounds of the above formula may be produced conveniently by the process which comprises reacting the appropriate hydrazine with a cycloalkyl-alkyl aldehyde or a cycloalkyl-alkyl alkyl ketone to form an intermediate hydrazone which is then reduced to the desired hydrazine. This process may be represented as follows:

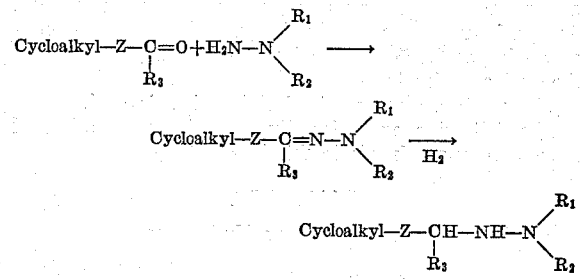

wherein cycloalkyl, $R_1$ and $R_2$ have the significance previously assigned, Z is a bond or a straight or branched alkylene group, $R_3$ is hydrogen or a lower alkyl group and

is equivalent to Y.

Some of the cycloalkyl-alkyl aldehydes and cycloalkyl-alkyl alkyl ketones which may be used in this process are cyclohexyl-ethylaldehyde, 2-cyclohexyl-propionaldehyde, cyclopentyl-butyraldehyde, cyclohexyl-acetal, cyclopropyl-ethyl methyl ketone, cyclopentyl-propyl methyl ketone, cyclohexylethyl methyl ketone, and cyclohexyl-methyl methyl ketone.

In addition to hydrazine, substituted hydrazines such as N,N-dimethylhydrazine, N,N-diethylhydrazine, N,N-dibenzylhydrazine, N,N-di-phenylethyl hydrazine, N-methyl-N-ethyl hydrazine, methyl hydrazine, ethylhydrazine, propylhydrazine, phenylethylhydrazine, acetyl hydrazine, propionyl hydrazine, benzoyl hydrazine, phenylacetyl hydrazine, isonicotinyl hydrazine, benziloyl hydrazine and the like.

Reaction between a cycloalkyl-alkylaldehyde or a cycloalkyl-alkyl alkyl ketone and the hydrazine reactant is conveniently effected by combining the reactants in the presence of water, a lower alcohol such as methanol, ethanol or isopropanol, or a solvent such as tetrahydrofuran or dioxane. The carbonyl compound is advisably added to a refluxing solution of the hydrazine. When hydrazine ($R_1=R_2=H$) is the reactant, a large excess, such as a 200% molar excess, of hydrazine is employed to preferentially form a mono-substituted hydrazone rather than a bis-hydrazone. With substituted hydrazine reactants an excess is not required. At reflux the reaction goes to substantial completion in about 1 to 5 hours although longer reaction periods may be required sometimes. The desired hydrazone may be recovered readily from the reaction mixture by removing the solvent as by distillation, dissolving the residue in water, extracting with ether and collecting the product by distillation under reduced pressure.

The intermediate hydrazone may be reduced to the corresponding hydrazine by use of a suitable reducing agent. Lithium aluminum hydride is a suitable chemical reducing agent although catalytic hydrogenation also may be employed. With lithium aluminum hydride, the reduction may be conveniently effected by initimately combining the reactants in an inert organic solvent such as anhydrous ether, dioxane or tetrahydrofuran. Elevated temperatures such as the reflux temperature enhance the reaction. At reflux temperature, from 1 to 8 hours is usually sufficient to substantially complete the reaction. After the reaction is terminated water may be added to the mixture to decompose excess lithium aluminum hydride. To recover the product, the organic phase is separated and the aqueous residue extracted with the same solvent. The organic phase and extracts then may be combined, dried, and the product distilled.

Catalytic hydrogenation of the hydrazones may be effected with platinum or palladium or oxides thereof as catalysts at atmospheric or elevated pressures. A weakly acidic aqueous medium may be used for reducing the hydrazones catalytically. The product may be recovered by conventional methods.

Representative of the cycloalkyl-alkyl hydrazines which may be produced from the corresponding hydrazones are N,N-dimethyl-N'-cyclohexyl-ethyl hydrazine, N,N-diphenyl-N'-cyclopentylpropyl hydrazine, N,N-dibenzyl-N'-cyclopropyl-butyl hydrazine, N-methyl-N-ethyl-N'-cyclohexyl-pentyl hydrazine, cyclohexyl-ethyl hydrazine, 1-cyclohexyl-2-propyl hydrazine, 1-cyclopentyl-2-propyl hydrazine, N-cyclohexyl-ethyl-N'-ethyl hydrazine, N-cyclopentyl-butyl-N'-phenylpropyl hydrazine, N-cyclohexyl-propyl-N'-benzyl hydrazine, N-cyclohexyl-methyl-N'-acetyl hydrazine, N-cyclopentyl-ethyl-2-propionyl hydrazine, N-cyclohexyl-methyl-N'-benzoyl hydrazine, N-cyclohexyl-propyl-N'-phenylacetyl hydrazine, N-cyclohexyl-propyl-N'-isonicotinyl hydrazine and the like.

The hydrazines of this invention are readily reacted with inorganic and organic acids to form acid addition salts. The hydrochloride, hydrobromide, fumarate and sulfate are representative acid addition salts which can be formed.

Also provided by this invention are methanesulfonic acid derivatives of the novel hydrazines described above.

These methanesulfonic acid derivatives may be represented by the formula

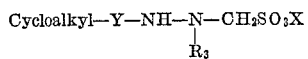

wherein cycloalkyl and Y have the significance assigned above, $R_3$ represents the methanesulfonic acid group and alkali metal salts thereof and the groups represented by $R_1$, and X is hydrogen or an alkali metal such as sodium, potassium or lithium.

Methanesulfonic acid derivatives of the formulae

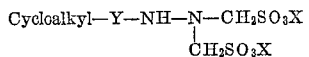

and

wherein cycloalkyl, X and Y have the assigned significance, are readily produced by reacting a cycloalkyl-alkyl hydrazine with formaldehyde and an alkali metal bisulfite to form a cycloalkyl-alkyl hydrazine di-alkali metal di-methanesulfonate which upon hydrolysis gives the monomethane sulfonic acid derivative. This reaction may be represented as follows:

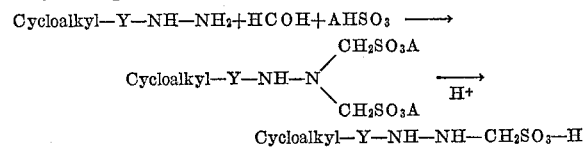

wherein cycloalkyl and Y have the assigned significance and A is an alkali metal.

The methanesulfonic acid derivatives of the formula

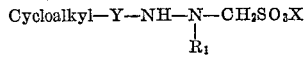

wherein cycloalkyl, X, Y and $R_1$ have the assigned significance but $R_1$ is not hydrogen, are also produced by reacting the hydrazine with formaldehyde and an alkali metal bisulfite but, since $R_1$ is not hydrogen, only one methanesulfonic acid group is introduced initially on the hydrazine compound. This reaction may be represented as follows:

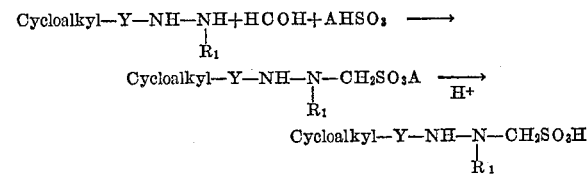

wherein cycloalkyl, Y, A and $R_1$ have the assigned significance except that $R_1$ is not hydrogen.

Reaction between the hydrazine, formaldehyde and alkali metal bisulfite is readily effected by bringing the reactants together in a liquid reaction medium, advisably water, and refluxing the mixture with stirring. Equimolar quantities of the reactants are generally employed. A reflux time of about one to five hours is usually adequate for substantially complete reaction to take place. The desired reaction product may be readily recovered from the reaction mixture by conventional methods such as concentrating the mixture to dryness and crystallizing the product from a solvent in which it is not more than sparingly soluble.

Those compounds produced from N',N'-di-unsubstituted-N-cycloalkyl-alkyl hydrazines have two methanesulfonate groups bonded to the same nitrogen of the hydrazine moiety. By treating such compounds with a strong acid, such as hydrochloric acid, one of the methanesulfonate groups is hydrolyzed off to produce a cycloalkyl-alkyl hydrazine methanesulfonic acid. A salt of the acid may be readily produced by treating the acid with an alkali metal base such as a hydroxide or carbonate. The alkali metal methanesulfonates are readily converted to the free hydrazine methanesulfonic acid by treating the salts with a suitable acid, and preferably hydrochloric acid.

Representative of the compounds so produced are 1-cyclohexyl-2-propyl hydrazine sodium methanesulfonate, cyclopentyl-ethyl hydrazine di-sodium di-methanesulfonate and similar derivatives of the hydrazines described above.

The compounds of this invention stimulate the central nervous system via two pathways: (1) direct central nervous system stimulation and (2) inhibition of the enzyme monoamine oxidase which is responsible for the metabolic destruction of such central excitatory amines as norepinephrine and 3-hydroxytyramine (dopamine). The inhibition of monoamine oxidase allows the excitatory amines to accumulate in the brain tissue and exert their prolonged stimulant effect. Hence, central stimulation is brought about both directly and indirectly by these compounds.

The cycloalkyl-alkyl hydrazines do not exert a central stimulant effect (analeptic effect) quite as high, nor a monoamine oxidase inhibitory action nearly as strong, as do the aralkyl (phenylisopropyl) hydrazines. These properties would impart to the cycloalkyl-alkyl hydrazines a greater safety factor as therapeutic agents in the treatment of mild depressions. There is a need for compounds having a central stimulatory action which is reinforced by mild monoamine oxidase inhibitory properties.

The compounds of this invention may be administered to animals as pure compounds. It is advisable, however, to first combine one or more of the compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration or, instead, the powders may be added to suitable foods and liquids, including water, to facilitate administration.

The powders also may be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the active hydrazines, and may be administered one or more at a time at regular intervals. Such unit dosage forms, however, should generally contain a concentration of 0.1% to 10% by weight of one or more of the active hydrazines.

The preferred route of administration is oral.

The following examples illustrate the preparation of specific compounds within this invention.

EXAMPLE 1

*Cyclohexylacetone Hydrazone*

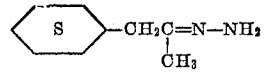

A solution of 70 g. (0.50 mole) of cyclohexyl acetone in 400 cc. of methanol was added to a refluxing solution of 87.5 g. (1.5 mole) of 85% hydrazine hydrate in 400 cc. of methanol. Stirring and refluxing were continued for 3 hours. The methanol was removed by distillation. The residue was stirred up with water, made strongly alkaline with solid potassium hydroxide and extracted with ether. The ether extracts were dried with potassium carbonate and the product collected by distillation in vacuo; B.P. 70° C. (0.35 mm.); yield 72.3 g. (94%); $N_D^{20}$ 1.4977.

*Analysis.*—Calcd. for $C_9H_{18}N_2$: N, 9.08. Found: N, 8.82.

EXAMPLE 2

Cyclopentylacetone Hydrazone

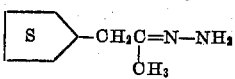

This compound was prepared by a procedure analogous to that described in Example 1. From 0.5 mole of cyclopentylacetone and 1.5 mole of hydrazine (in the form of 85% hydrazine hydrate) there was obtained 65 g. (93%) of the hydrazone; B.P. 60° C. (0.20 mm.).

EXAMPLE 3

1-Cyclohexyl-2-Propyl Hydrazine

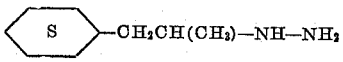

The hydrazone of Example 1 was dissolved in 200 cc. of ethanol and 27 g. (0.45 mole) of glacial acetic acid. The mixture was subjected to hydrogenation in the presence of 1.0 g. of platinum oxide catalyst at 60 p.s.i. of hydrogen. The catalyst was removed by filtration and the solvent taken off by distillation. The residue was treated with dilute aqueous potassium hydroxide, extracted with ether, the ether extracts dried with potassium carbonate and the base fractionally distilled; B.P. 63° C. (0.25 mm.); yield 51.8 g. (74%); $N_D^{20}$ 1.4796.

*Analysis.*—Calcd. for $C_9H_{20}N_2$: N, 8.96. Found: N, 8.21.

The hydrochloride salt was prepared in a mixture of 320 cc. of dry ether and 265 cc. of ethanol with ethereal hydrochloric acid, yield 53 g., M.P. 109–110° C. Recrystallization from acetonitrile produced no change in the M.P.

*Analysis.*—Calcd. for $C_9H_{21}ClN_2$: Cl, 18.39; N, 14.53. Found: Cl, 18.52; N, 14.60.

EXAMPLE 4

1-Cyclopentyl-2-Propyl Hydrazine

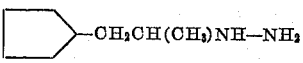

The hydrazone of Example 2 was reduced to the desired hydrazine in a manner identical to the procedure of Example 3; B.P. 50° C. (0.20 mm.).

Various changes and modifications of the invention can be made and, to the extent that such variations incorporate the spirit of this invention, they are intended to be included within the scope of the appended claims.

What is claimed is:

1. A member of the group consisting of compounds of the formulae

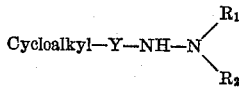

and the hydrochloride, hydrobromide, fumarate and sulfate addition salts thereof, wherein cycloalkyl represents a member of the group consisting of cyclohexyl, cyclopentyl and cyclopropyl, Y is an alkylene group of one to five carbons, and $R_1$ and $R_2$ are members of the group consisting of hydrogen, lower alkyl, phenyl and phenyl-lower alkyl.

2. A compound of the formula

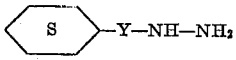

in which Y is an alkylene group of one to five carbons.

3. A compound of the formula

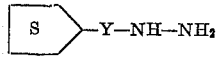

in which Y is an alkylene group of one to five carbons.

4. 1-cyclohexyl-2-propyl hydrazine.
5. 1-cyclopentyl-2-propyl hydrazine.

References Cited in the file of this patent

UNITED STATES PATENTS

| | | |
|---|---|---|
| 1,892,972 | Urbain | Jan. 3, 1933 |
| 2,770,643 | Anderson | Nov. 13, 1956 |
| 2,806,851 | Sisler et al. | Sept. 17, 1957 |
| 2,830,050 | Biel | Apr. 8, 1958 |

OTHER REFERENCES

Votocek et al.: C.A., vol. 26, page 5294 (1932).
Hielbron et al.: J. Chem. Soc. (London), vol. of 1949, pp. 287–93.
Byrkit et al.: Ind. and Eng. Chem., vol. 42, pp. 1862–73 (1950).
Beilstein: Handbach Der Organischen Chemie, vol. 15, II, page 42 (1951).
Morris et al.: J.A.C.S., vol. 76, pp. 1237–41 (1954).
Jacquier et al.: Bull. Soc. Chim., France, vol. of 1956, pp. 1653–66.